US008927953B2

(12) United States Patent
Boissevain et al.

(10) Patent No.: US 8,927,953 B2
(45) Date of Patent: Jan. 6, 2015

(54) ILLUMINATED CURTAIN WALL

(71) Applicant: Koninklijke Philips N.V., Eindhoven (NL)

(72) Inventors: Christopher James Boissevain, San Marcos, TX (US); Joseph Garcia, San Antonio, TX (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/188,742

(22) Filed: Feb. 25, 2014

(65) Prior Publication Data
US 2014/0166908 A1 Jun. 19, 2014

Related U.S. Application Data

(63) Continuation-in-part of application No. 13/606,046, filed on Sep. 7, 2012.

(51) Int. Cl.
| F21V 15/01 | (2006.01) |
| F21S 2/00 | (2006.01) |
| F21V 5/00 | (2006.01) |
| F21S 8/00 | (2006.01) |
| E04B 2/96 | (2006.01) |
| F21V 33/00 | (2006.01) |
| F21V 23/04 | (2006.01) |
| H05B 33/08 | (2006.01) |
| F21V 5/04 | (2006.01) |
| F21V 7/00 | (2006.01) |
| F21V 13/04 | (2006.01) |
| F21Y 101/02 | (2006.01) |
| F21Y 103/00 | (2006.01) |

(52) U.S. Cl.
CPC . *F21S 8/033* (2013.01); *E04B 2/96* (2013.01); *F21V 33/006* (2013.01); *F21V 5/00* (2013.01); *F21V 23/0471* (2013.01); *H05B 33/0803* (2013.01); *F21V 5/04* (2013.01); *F21V 7/005* (2013.01); *F21V 7/0091* (2013.01); *F21V 13/04* (2013.01); *F21V 15/013* (2013.01); *F21Y 2101/02* (2013.01); *F21Y 2103/003* (2013.01)
USPC ....... 250/504 R; 362/125; 362/145; 362/147; 52/101; 52/750

(58) Field of Classification Search
CPC .............. E06B 7/28; F21S 2/00; F21V 15/01; F21V 5/02; F21V 33/006; G02B 6/0095
USPC ......... 250/504 R; 362/125, 145, 147; 52/101, 52/750
See application file for complete search history.

(56) References Cited

U.S. PATENT DOCUMENTS

| 5,253,459 A | 10/1993 | Parinas et al. |
| 5,313,724 A | 5/1994 | Warner |

(Continued)

FOREIGN PATENT DOCUMENTS

| CN | 201850685 U | 1/2010 |
| CN | 201739904 U | 2/2011 |
| CN | 201765765 U | 3/2011 |

*Primary Examiner* — David A Vanore

(57) ABSTRACT

A window lighting system may include a frame (1071, 1171, 1271, 1471) defining a perimeter of a window (1070, 1170, 1270, 1470). The frame may have a hollow interior. A driver (30), which may be located within the hollow interior or external to the window lighting system, may be configured to drive one or more light sources (1076, 1176, 1276, 1486). A lens (46) may be disposed along the hollow interior to focus light emitted by the one or more light sources across a surface of the window or into an interior of a building.

15 Claims, 13 Drawing Sheets

(56) References Cited

U.S. PATENT DOCUMENTS

| | | | |
|---|---|---|---|
| 6,802,156 B2 * | 10/2004 | Sherrett et al. | 49/445 |
| 6,993,873 B2 | 2/2006 | Biebuyck et al. | |
| 8,070,310 B2 * | 12/2011 | Harwood | 362/147 |
| 8,598,998 B2 * | 12/2013 | Vassilev et al. | 340/384.2 |
| 8,668,372 B2 * | 3/2014 | Duerksen et al. | 362/629 |
| 2003/0121198 A1 * | 7/2003 | Watermann | 43/1 |
| 2005/0166537 A1 * | 8/2005 | Geiger | 52/750 |
| 2007/0190343 A1 * | 8/2007 | Arkles | 428/447 |
| 2008/0219002 A1 | 9/2008 | Sommers et al. | |
| 2010/0223861 A1 * | 9/2010 | Warwick | 52/101 |

\* cited by examiner

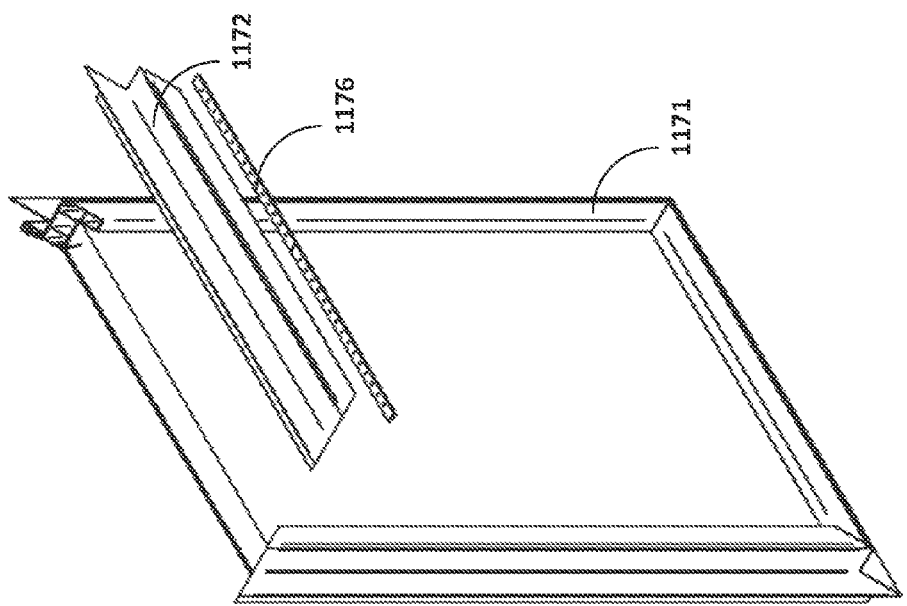
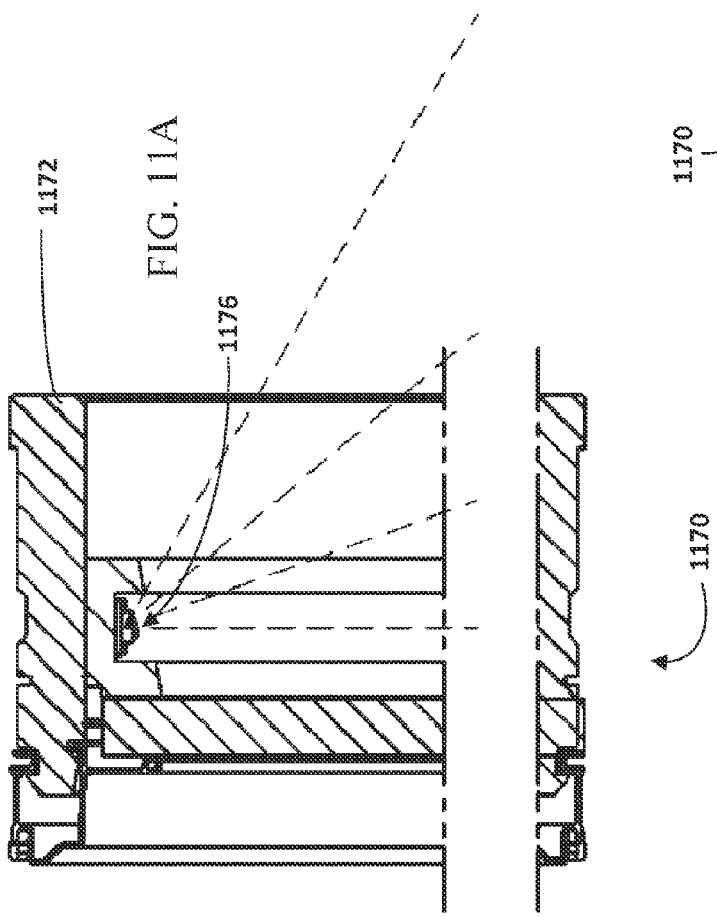
FIG. 11A
FIG. 11B

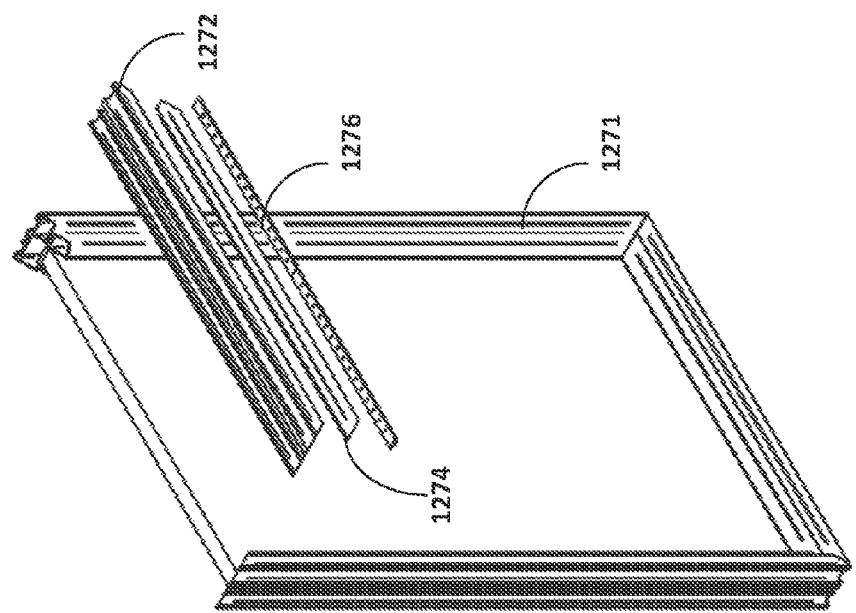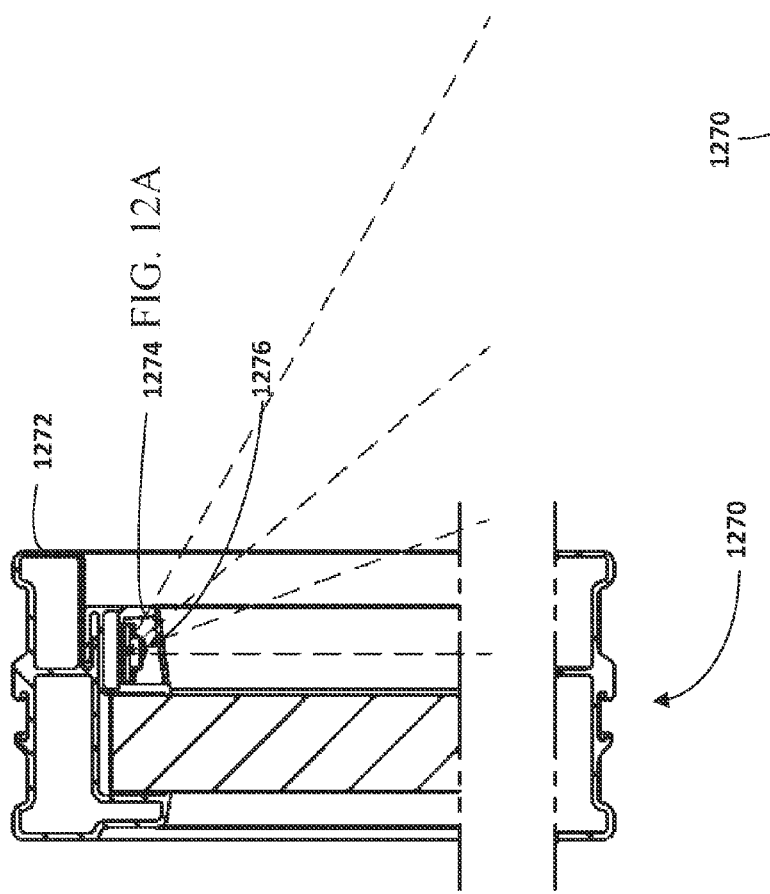
FIG. 12A
FIG. 12B

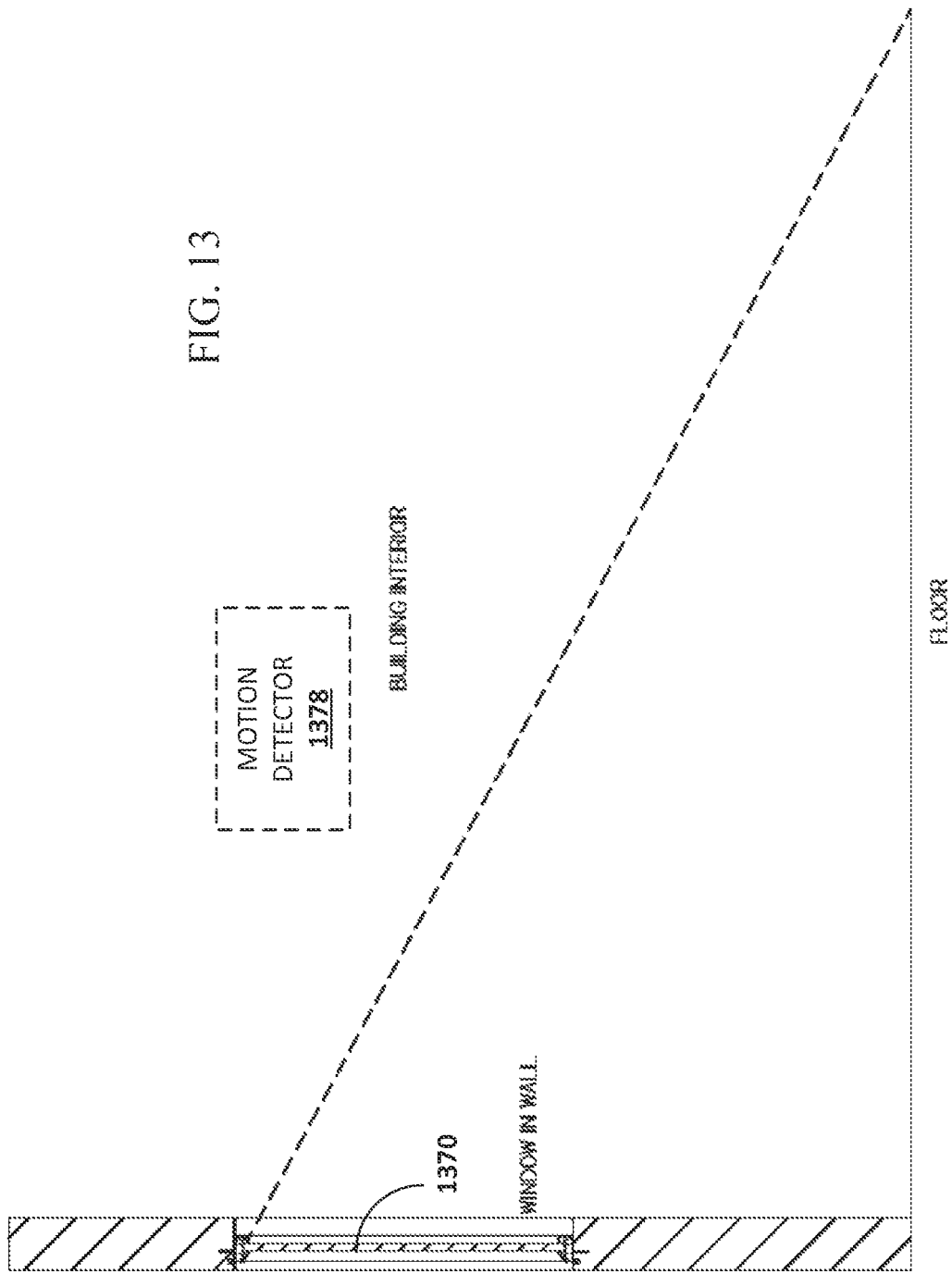

ILLUMINATED CURTAIN WALL

CROSS REFERENCE TO RELATED APPLICATIONS

This is a continuation-in-part of U.S. patent application Ser. No. 13/606,046, entitled "ILLUMINATED CURTAIN WALL" and filed Sep. 7, 2012, the disclosure of which is incorporated by reference in its entirety.

TECHNICAL FIELD

Present embodiments are related to a curtain wall assembly. More specifically, present embodiments are related to a curtain wall assembly having integrated illumination capabilities which may be utilized on both the vertical and horizontal members of the curtain wall.

BACKGROUND

Curtain wall assemblies are utilized on the outer covering or surface of the building and provide glass assemblies and frames which form the outer barrier for a building construction. Curtain wall systems have a plurality of horizontal and vertical members which may receive glass panes therein, The curtain wall assemblies typically are not load bearing structures but instead only carry the weight of the glass and the frame itself. The curtain wall transfers wind loading on the building through the floors and columns of the building and also resists air, rain or other weather elements entry into the building.

While it is known to utilize lighting systems on the exterior of a building, known lighting systems add visual clutter in that they typically require fixtures exteriorly mounted thereby reducing visual clarity of the building façade. Additionally, these structures provide wind resistance which must be compensated for in certain constructions. Finally, the exterior light fixtures also provide a source of water and air leakage into the building and generally require maintenance for these problems during the life of the fixture and/or the building.

Given the foregoing deficiencies, it would be appreciated that a lighting system is desirable which may be integrated into building structure and therefore does not add to the problems previously described.

SUMMARY

In one aspect, a window lighting system may include a frame defining a perimeter of a window. The frame may have a hollow interior. A driver may be configured to drive one or more light sources. A lens may be disposed along the hollow interior to focus light emitted by the one or more light sources across a surface of the window or into an interior of a building, In various embodiments, the window lighting system may include a motion detector configured to provide, to the driver, a signal indicative of a person's presence on an exterior side of the window, In various versions, the motion detector comprises a passive infrared (PIR) or microwave detector. In various versions, the driver may be configured to cause light to be emitted by the one or more light sources into the interior of the building in response to the signal. In various versions, the driver may be configured to cause the one or more light sources to cease emission of light into the interior of the building a predetermined time interval after receiving the signal from the motion detector.

In various embodiments, the one or more light sources may be configured to emit one or more beams of light across the surface of the window. In various versions, the one or more beams of light may be invisible to humans. In various versions, the one or more beams of light are ultraviolet light. In various versions, the driver may be configured to selectively energize and de-energize the one or more light sources in a pattern.

In various embodiments, at least the frame of the window is constructed with vinyl, wood, fiberglass, or any combination thereof.

In another aspect, a method of warning flying creatures of the presence of a window may include providing, within a frame of a window, a plurality of light sources, and selectively energizing the plurality of light sources to emit light in a spectrum invisible to humans across a surface of the window. In various embodiments, the method may further include selectively energizing the plurality of light sources in a predetermined pattern. In various embodiments, the spectrum is the ultraviolet spectrum or the infrared spectrum.

The term "light source" or "luminaire" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein.

The term "lighting fixture" is used herein to refer to an implementation or arrangement of one or more lighting units in a particular form factor, assembly, or package. Such luminaire or lighting fixture may include one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "radial" is used to refer to the direction from the center of the circular structure outward or from the circumference inward along an imaginary radius. The term "axial" is used to mean situated in, on, or along an axis or pertaining to an axis of rotation.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 11A and 11B depict an example of how a wood window may be configured with selected aspects of the present disclosure.

FIGS. 12A and 12B depict an example of how a fiberglass window may be configured with selected aspects of the present disclosure.

FIG. 13 depicts one example of how a window configured with selected aspects of the present disclosure may be used to cast light towards a building interior.

DETAILED DESCRIPTION

There is a need in the art to provide a building façade with a curtain wall having an integrated illumination.

More generally, it would be beneficial to provide a luminaire within the curtain wall which provides uplight, downlight, and side or lateral lighting to either or both of the façade or areas adjacent the façade, such as walkways.

In view of the foregoing, various embodiments and implementations of the present invention are directed to a curtain wall assembly having integrated lighting.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the illuminated curtain wall disclosed herein are particularly suited for and described in combination with various structural shapes defining members of the mullions and transoms. The shapes shown and/or described are not to be considered limiting. Accordingly, for illustrative purposes, the claimed invention is discussed in conjunction with components of a curtain wall frame. However, other configurations and applications of the adjustable frame and/or members are contemplated without deviating from the scope or spirit of the claimed invention. For example, in some embodiments the illuminated curtain wall may be implemented in combination with other structures of a lighting fixture (e.g., controller(s), transformer(s) motion sensor(s), dimming module(s), and/or photo sensor(s)), another non-LED power supply, and/or with one or more other lighting components.

Referring generally to FIGS. 1-9, embodiments of an illuminated curtain wall are shown and described wherein the illuminated curtain wall may provide lighting in various directions along a building façade or an area adjacent the façade, such as a walkway. The teachings may be utilized with various types of façades including, but not limited to, storefront structures as well as other types of commercial building façades. Additionally, the illuminated curtain wall may be utilized in the frame members which are both horizontal, vertical arid non-perpendicular as well.

Figure 1:
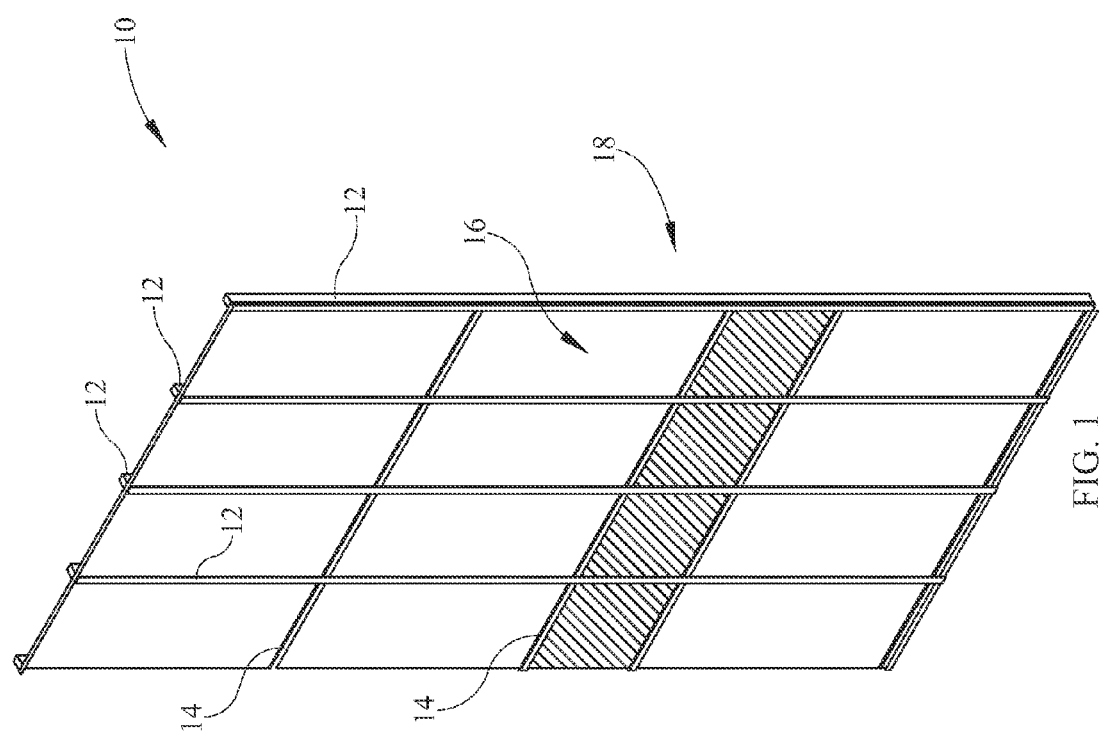
FIG. 1 is a perspective view of an exemplary building façade and curtain wall.

Referring now to FIG. 1, an exemplary curtain wall assembly 10 is depicted having frame members formed of a plurality of vertical mullions 12 and a plurality of horizontal transoms 14. The vertical mullions 12 and horizontal transoms 14 define a frame wherein glass, glass-like or other transparent panels 16 are positioned to form a building façade 18.

The assembly 10 is depicted having horizontal member illuminated but one skilled in the art should realize that the vertical mullions 12 of the curtain wall assembly 10, may also be constructed to include illumination capability.

Figure 2:
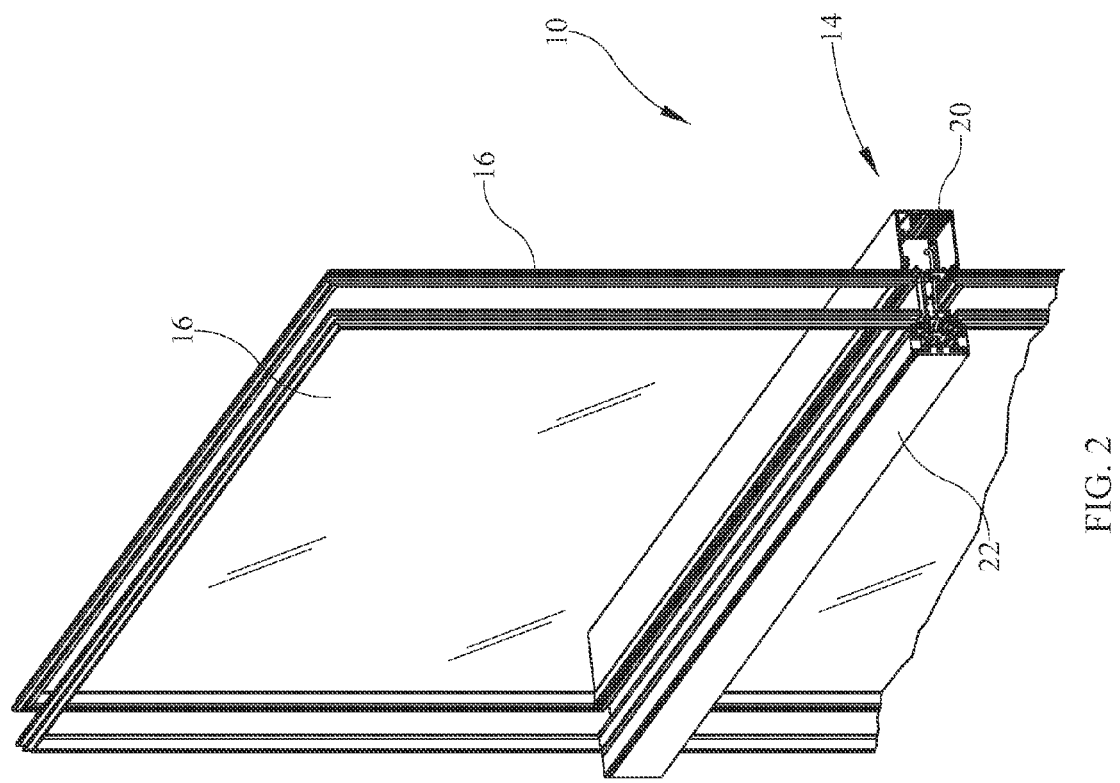
FIG. 2 is a perspective view of a portion of the exemplary curtain wall.

Referring now to FIG. 2, the assembly 10 is shown wherein the vertical mullions 12 are removed for clarity and a horizontal transom 14 is shown between transparent panels 16. The horizontal transom 14 is shown to comprise an internal component 20 and an external cap 22. The same structural arrangement may be used for vertical mullions 12. The transparent panels 16 extend from an upper side of the horizontal transom 14 and from a lower side to form the depicted portion of the curtain wall assembly 10. The cap 22 and the transom 14 connect to capture the transparent panel or glass 16 therebetween.

In the embodiment shown, a driver 30 is depicted within the internal portion 20 of the horizontal transom 14. The driver 30 drives one or more light emitting diodes (LEDs) on a printed circuit board to allow uplighting, downlighting forward lighting or lateral lighting. One or more lenses are positioned within the cap 22 so that the LED light is emitted to provide exterior lighting from the curtain wall assembly 10 toward the building without the need for exterior fixtures to be additionally connected to the façade 18.

Figure 3:
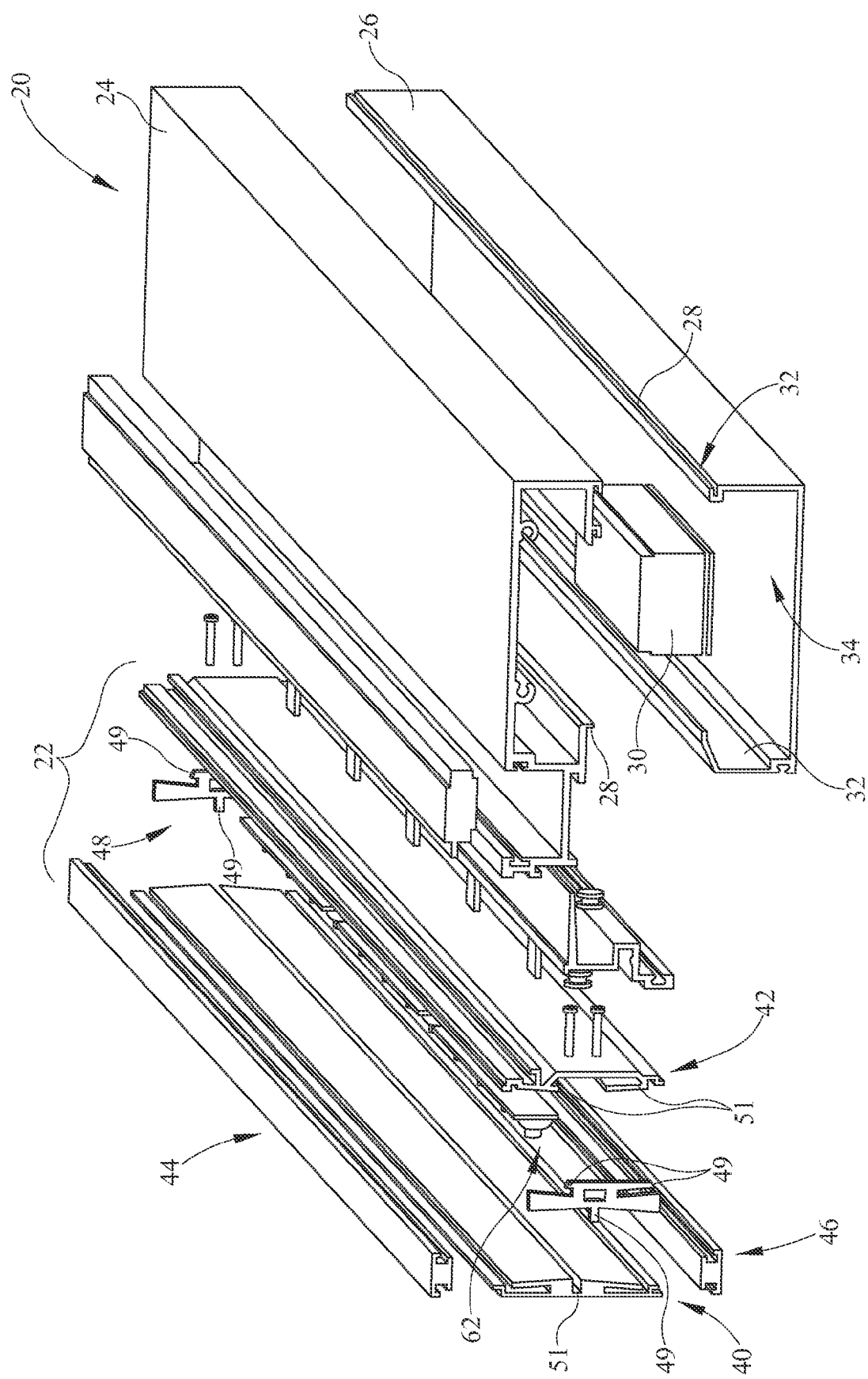
FIG. 3 is an exploded assembly view of an illuminated curtain wall member.

Referring now to FIG. 3, an exploded perspective view of the horizontal transom 14 is depicted. The transom 14 is formed of an internal component 20 and an exterior cap 22 positioned on the exterior of the building. The internal component 20 includes a cover 24 and a tray 26. Both of these structures are generally U-shaped and have corresponding retaining lips 28 and slots 32. The cover 24 is connected to the tray 26 by this or other means and is generally hollow inside defining a cavity 34. Within the cavity 34, the driver 30 is located to power the LED lamps 62 which are positioned either in the internal component 20 or the cap 22.

The internal component 20 is extruded according to the instant embodiment. The cover 24 and tray 26 may be extruded for ease of manufacturing and may be formed of a lightweight metal material such as aluminum to provide strength while adding only limited weight to the budding structure. Additionally, the series of retaining lips 28 and slots 32 which are formed in the exemplary extrusions provide for ease of construction when the curtain wall assembly 10 is being assembled in the field. The use of extruded materials also allow for a multitude of shapes to be formed depending on the cavity size and shape needed for the construction process.

To the left of the internal component 20 is the cap 22, This cap 22 is connected by fasteners, slots and/or retaining beads or lips to the internal component 20. The cap 22 has a first or outer sidewall 40 and a second or inner sidewall 42. In the embodiment depicted, the outer sidewall 40 and inner sidewall 42 are generally vertical and are also extruded, for example, formed of aluminum in the horizontal direction. The upper and lower ends include lip structures to receive and retain either or both of an upper lens 44 and a lower lens 46. According to vertical mullion embodiments, the lenses 44, 46 may provide left or right lateral lighting. The cap 22 further includes ends 48 which are positioned between the outer wall 40 and the inner wall 42 and by way of retaining features 49, 50 may be utilized to close the volume of the cap 22. These features 49 are positioned to cooperate with guide ways 51 within the outer wall 40 and inner wall 42. Various retaining mechanisms or features may be used in the assembly.

Figure 4:
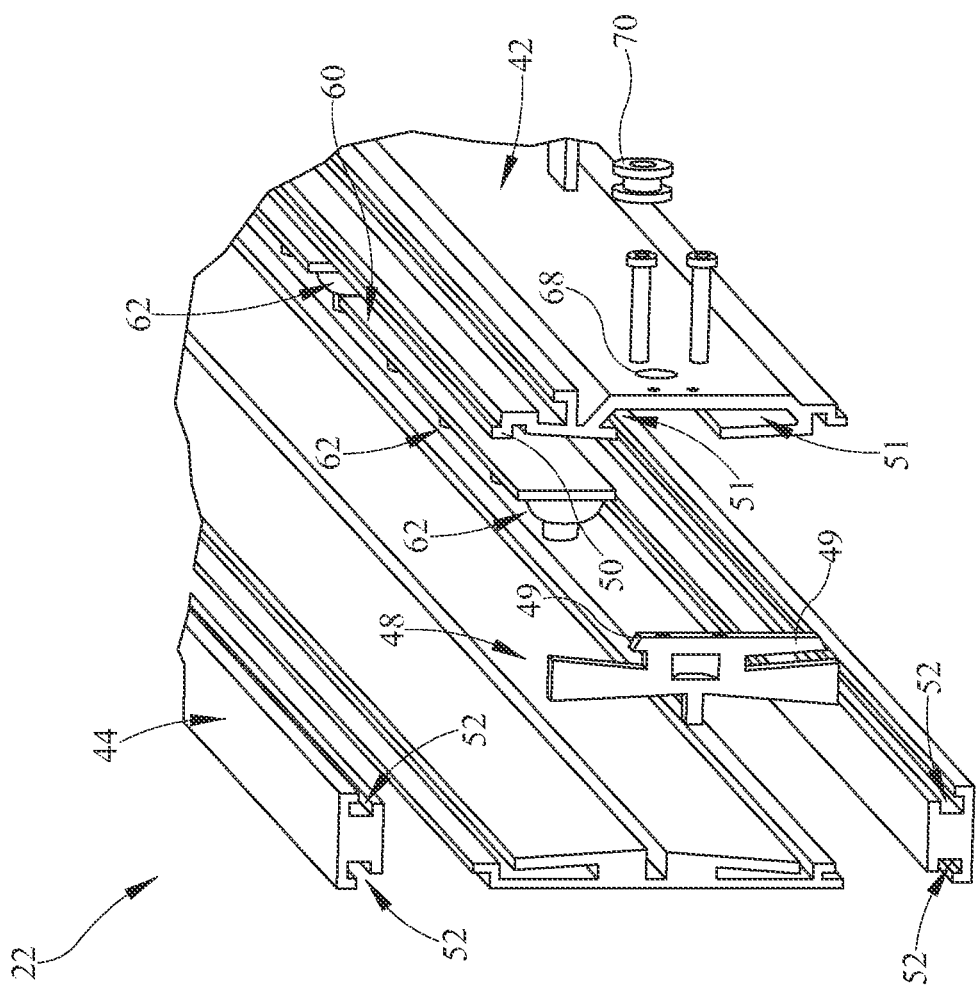
FIG. 4 is an exemplary exploded cap of the illuminated curtain wall member.

Referring now to FIG. 4, an exploded perspective view of the exemplary cap 22 is depicted. As shown in the figure, the upper ends of the outer wall 40 and inner wall 42 include retaining beads 50 which are received in slots 52 of the lenses 44, 46. As previously stated, the cap 22 may have either or both of an upper lens 44 and a lower lens 46. The exemplary embodiment includes two lenses however this should not be considered limiting as single lens embodiments or mufti-lenses embodiments may be formed.

As shown by the end piece 48, the retaining features 49 are shaped to fit within the opposed corresponding features 51 so that the ends 48 inhibit lateral movement of the inner wall 42. Additionally, the slots 52 of the upper and lower lenses 44, 46 also inhibit lateral movement as well as vertical movement of the lenses relative to the outer and inner walk 40, 42, This effectively locks the cap 22 assembly together. Various retaining shapes may be utilized which are complementary of one another.

Also shown within the FIG. 4 structure of the cap 22 is a printed circuit board 60. The circuit board includes a plurality of LED assemblies 62 on one side thereof. The LED assemblies 62 of the instant embodiment include side emitting lenses which direct light toward the lenses 44, 46. This allows illumination of the one or more lenses of the cap 22. The inner wall 42 includes a wireway 68 wherein a grommet 70 may be positioned. The grommet and wireway 68 allow passage of wire from the driver 30 in the internal component 20. The term internal is utilized merely to exemplify that that some portion of the component 20 is positioned towards the inside of the building but not necessarily entirely inside. Thus portions of the component 20 may be partially exposed along the exterior of the structure.

Figure 5:
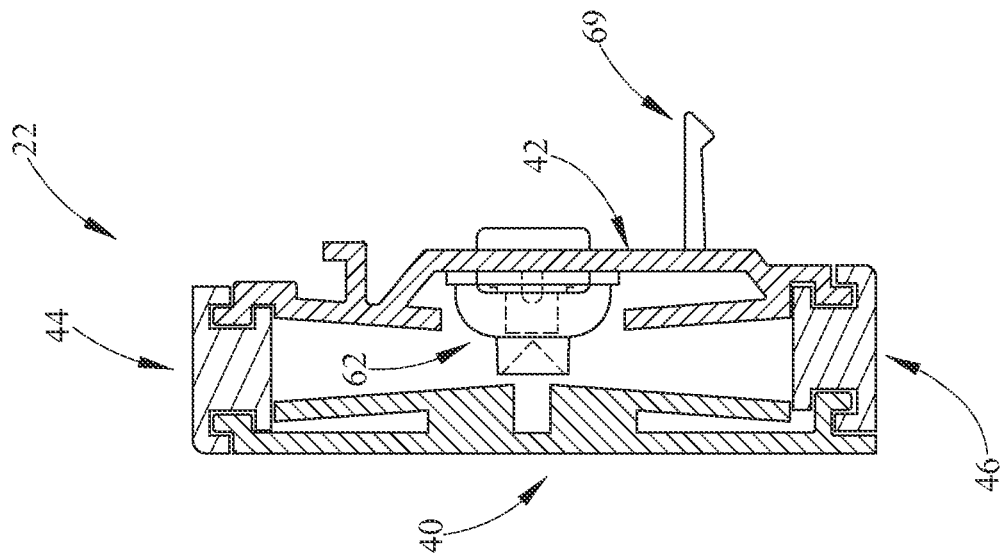
FIG. 5 is an end view of the exemplary cap of FIG. 4.

FIG. 5 shows a side section view of the cap 22 of FIG. 4. The structure is assembled and depicts how the outer and inner walls 40, 42 interact with the lenses 44, 46. Thus, it is clear from this structure that the LED light from inside the cap 22 moves outwardly toward the lenses 44, 46. Additionally, the FIG. depicts how the multiple retaining beads or lips interact with the corresponding and adjacent retaining beads or slots to lock the cap assembly 22 together. Also depicted in this FIG. more clearly is a retaining arm 69. This retaining feature 69 is utilized to connect with structure of the internal component 20 and retain the cap 22 thereto.

Figure 6:
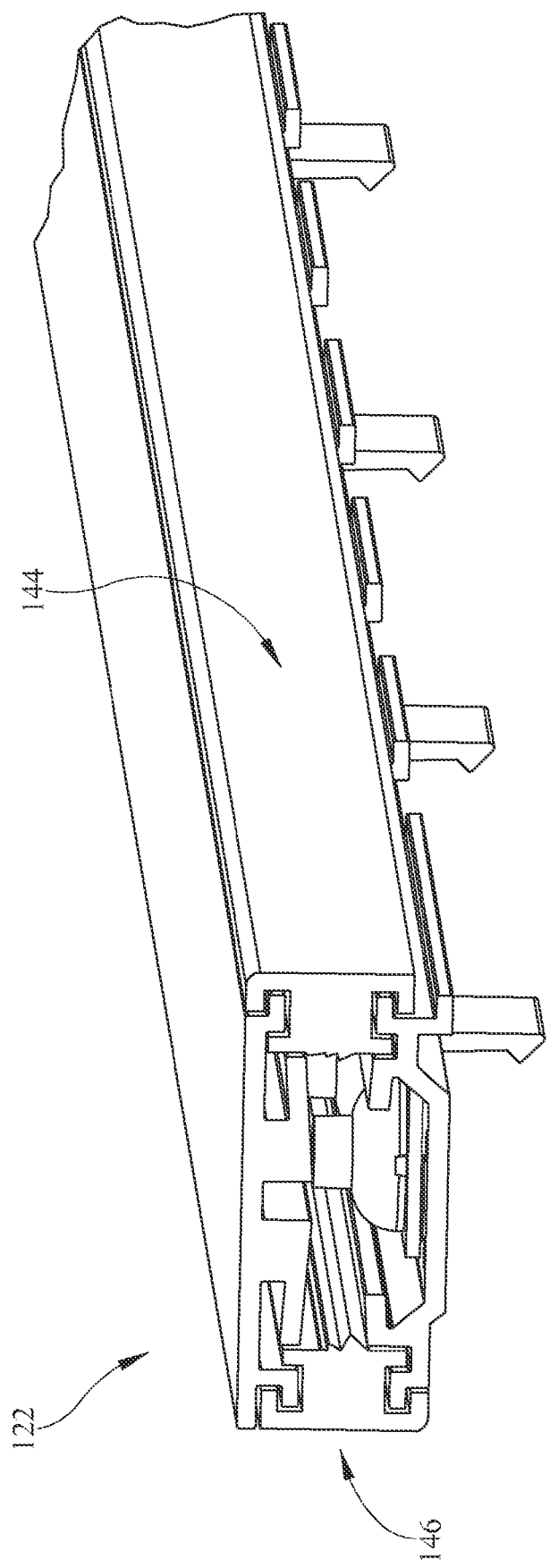
FIG. 6 is a perspective view of an assembled cap with a single lens.

Referring now to FIG. 6, for purpose of reference, an alternate cap 122 is depicted. hi this embodiment, the cap 122 is utilized to provide either an uplight or a downlight but not both. The exemplary embodiment utilizes a single lens 144. Opposite the lens 144 is a blank 146 which inhibits light passage therethrough and accordingly is only utilized to close the lower portion of the cap 122.

Additionally, one skilled in the art will understand that while the plurality of horizontal transoms are shown in the instant figures, the cap may be utilized and incorporated into the vertical mullions of the curtain wall assembly 10 in order to provide lighting along the vertical portions of the curtain wall.

Figures 7, 8, 9:
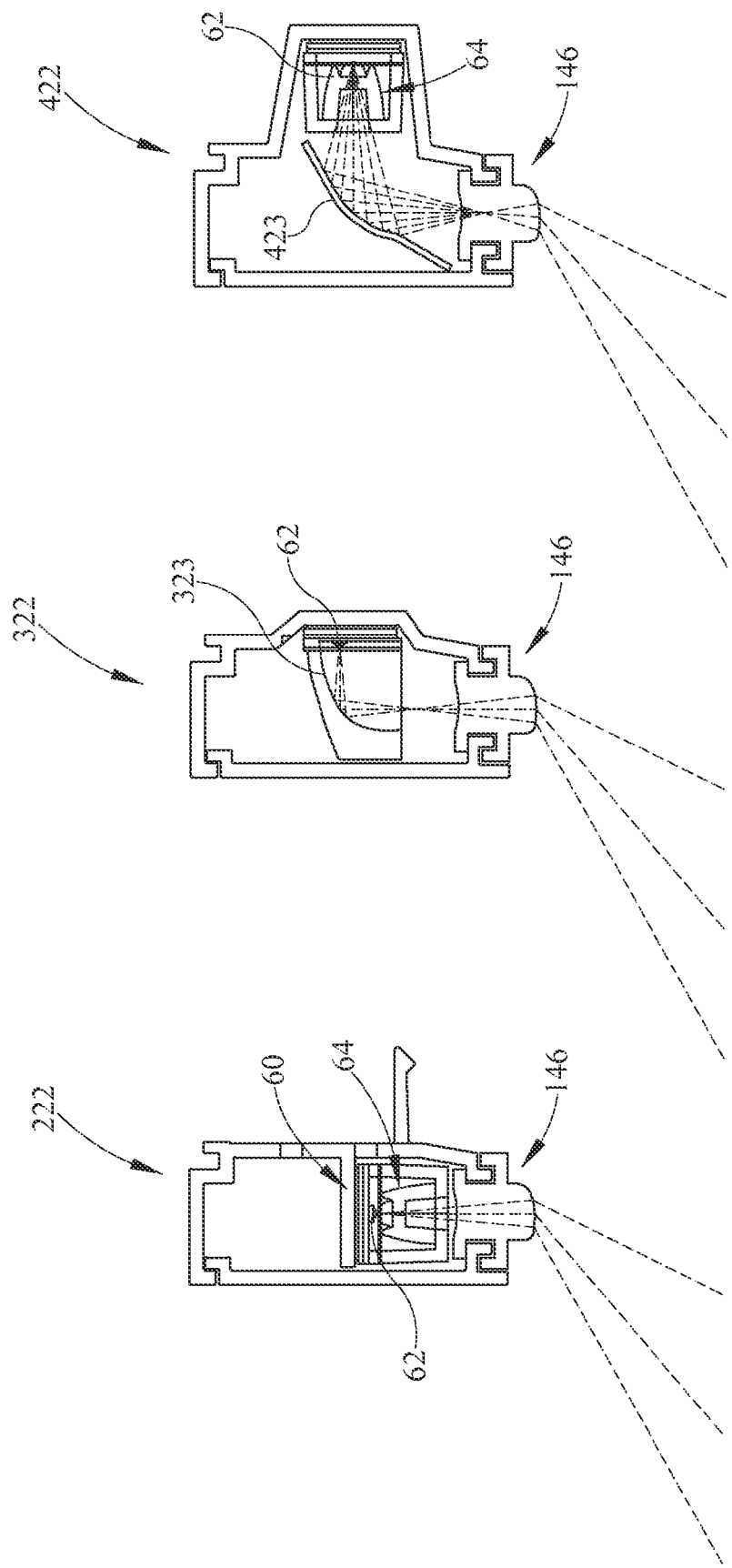
FIG. 7 is an end view of one alternative exemplary cap.
FIG. 8 is an end view of a second alternative exemplary cap.
FIG. 9 is an end view of a third alternative exemplary cap.
Figure 10B:
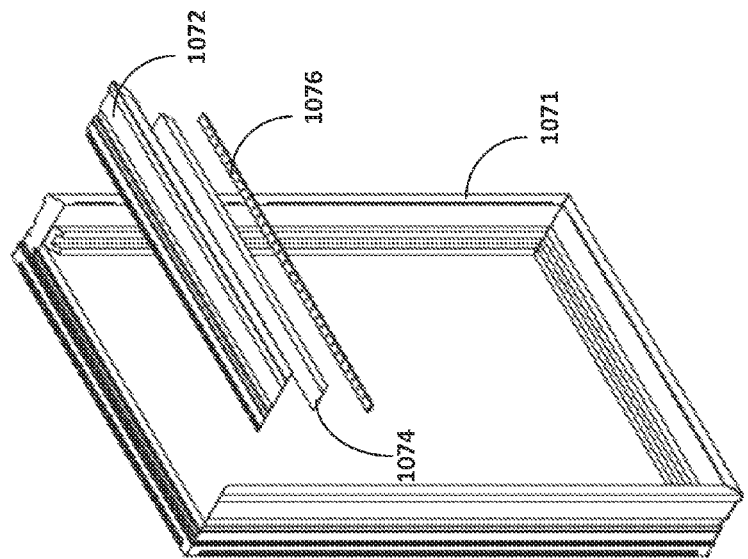
FIGS. 10A and 10B depict an example of how a vinyl window may be configured with selected aspects of the present disclosure.
Figure 10A:
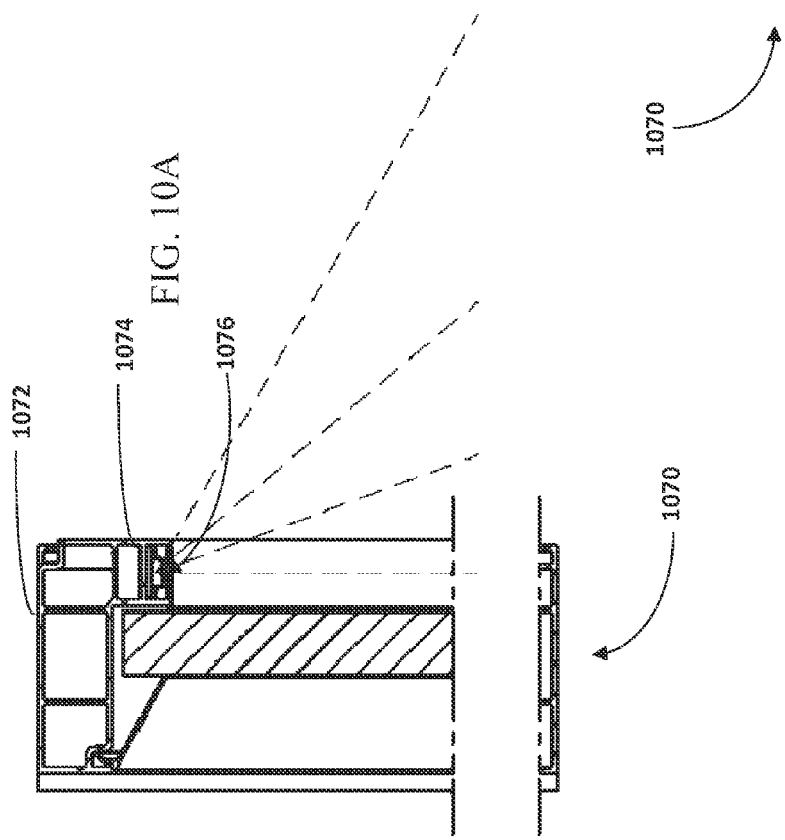

Referring now to FIG. 7-9, various embodiments are depicted of alternate optics which may be utilized. One skilled in the art will understand that any embodiments described in the disclosure may be utilized with other embodiments of the disclosure. For example the following structures maybe utilized with various structures defining vertical mullions and horizontal transoms. With reference first to FIG. 7, a cap 222 is shown with an embodiment for providing downlight, for example Illuminating Engineering Society of North America (IESNA) light distribution patterns. In this embodiment, the printed circuit board 60 and lamp 62 is oriented to shine light downward into a collimating optic 64. In this embodiment, the lamp 62 is placed on a horizontal surface in order to shine downwardly, for example. The collimate optic 64 then constrains and directs rays into the free form refractive optic or lens 146. The collimate optic may also provide a desirable shape to the light prior to shining on the lens 146. Moreover, at the bottom side of the cap 222, the free form optic 146 is positioned to create IESNA distributions. The free form optic 146 has an inner and outer dome designed to create IESNA distribution patterns on the walk way surface in front of the building façade. With this embodiment, the wall structures of the cap 222 have been formed in a manner different to the previous embodiments. However such structure is not necessarily limiting as various structural shapes may be utilized to form the cap embodiments and the internal components of the curtain wall as well.

Referring now to FIG. 8, an alternate embodiment is shown. While this embodiment also has a downlight function, the cap 322 is formed with internal optics, such as one or more reflectors or refractors 323, for example total internal reflection (TIR) refractors, to turn the light through a preselected angle, for example 90 degrees, downward. From this embodiment, one skilled in the art should realize that while the lamp 62 is mounted within the cap 322, it is within the teachings of this disclosure that the lamp 62 be positioned within the adjacent portion of the curtain wall which connects to the cap 322. Additionally, one skilled will understand that although the embodiment shows a downlight function, the TIR refractor 323 may be rotated about a horizontal axis to provide an uplight function. The TIR refractor 323 redirects light into the lower 146 refractor, which then creates the IESNA distribution patterns. The distribution patterns are the same as FIG. 7 to include a Type II, Ill, or IV distribution.

Referring now to FIG. 9 a further alternate embodiment is shown. Again, for ease of comparison, the lamp 62 is shown in the cap 422. The cap is shaped so that the lamp 62 is spaced further from the reflector 423. The embodiment comprises a collimator 64 adjacent to the lamp 62 and turns the light through a preselected angle, As a non-limiting example, the angle of the instant embodiment is about 90 degrees. The reflector 423 is also shaped differently than that of FIG. 8. The reflector 423 is a free form shape comprised of multiple radii to redirect the light into the lower refractor 146. The lamp light is directed downwardly from the reflector 423 through the lens 146. The reflector 423 receives a collimated area of light from the lamp 62 and focuses the light within the refractor 146. Refractor 146 has both an inner and outer dome free form optic to control incoming rays and output put them as IESNA distribution, such as a Type II, III, or IV distribution.

FIGS. 10-16 depict various embodiments in which techniques described herein are applied. FIGS. 10A and 10B depict an example of how a vinyl window 1070 may be configured with selected aspects of the present disclosure, e.g., to cast light into an interior of a building or across the window. FIG. 10B is a partially exploded view depicting a frame 1071 that includes a head 1072 defining a hollow interior that includes an internal stop 1074 and LED modules 1076, assembled as shown. Internal stop 1074 may be used to contain light emitted by LED modules 1076 across a particular width or in a particular direction, e.g., towards a building interior or exterior, or across a window.

FIGS. 11A and 11B depict an example of how a wood window 1170 may be configured with selected aspects of the present disclosure. FIG. 11B is a partially exploded view depicting how a frame 1171 of wood window 1170 may include a head 1172 and LED modules 1176 assembled as shown. While an internal stop is not depicted, this is not meant to be limiting. In various embodiments, an internal stop similar to internal stop 1074 of FIG. 10B may be employed.

FIGS. 12A and 12B depict an example of how a fiberglass window 1270 may be configured with selected aspects of the present disclosure. FIG. 12B is a partially exploded view depicting a frame 1271 that includes a head 1272, an internal stop 1274 and LED modules 1276, assembled as shown.

FIG. 13 depicts one example of how a window 1370 configured with selected aspects of the present disclosure may be used to cast light towards a building interior. Many of the components utilized in the embodiment depicted in FIG. 13 may be similar to those described above with reference to FIGS. 1-9, simply in reverse. However, a motion detector 1378 (depicted schematically, may take various forms) has been added to detect when someone is present on the exterior side of the window. Various types of motion detectors may be employed, including but not limited to a passive infrared sensor (PIR), a microwave sensor, and so forth. Motion detector 1378 may detect a person's presence outside window 1370 and provide a signal indicative of that detected presence to a controller (not depicted in FIG. 13, e.g., driver 30). The controller may in turn energize one or more light sources, such as one or more LEDs in window 1370, to cast light on an interior of the building. This technique may be employed, for instance, to illuminate a view into a storefront window in response to the detection of passersby, while saving energy when no one is present.

Figure 14:
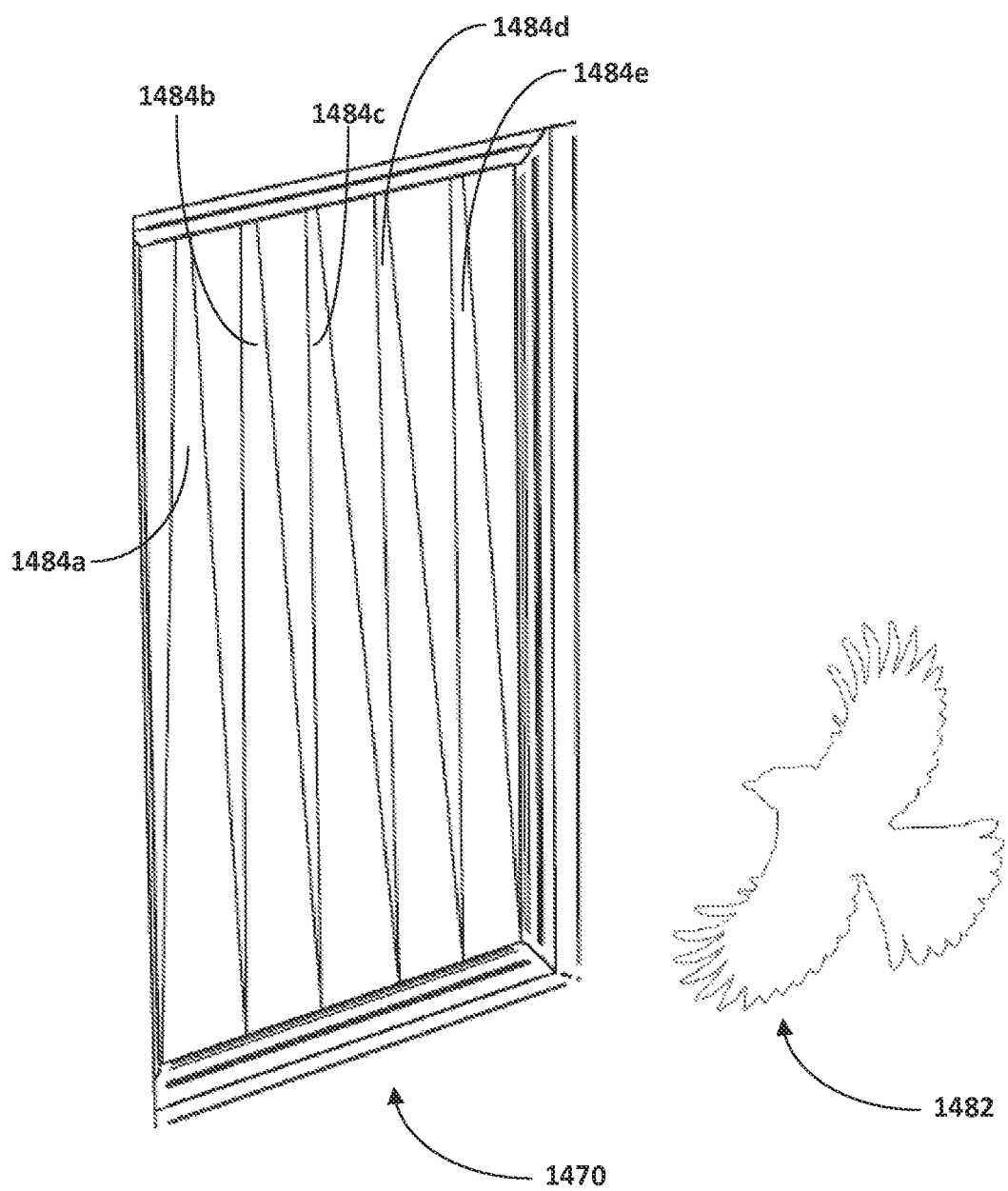
FIG. 14 depicts an example of how a window configured with selected aspects of the present disclosure may be used to prevent flying creatures from crashing into clear windows.

FIG. 14 depicts an example of how a window 1470 configured with selected aspects of the present disclosure may be used to warn a flying creature 1482 (e.g., bird, bat, flying insect, etc.) from crashing into window 1470. A plurality of low level beams of light 1484*a-e* may be emitted across window 1470. These low level beams 1484*a-e* may come in various spectrums, including but not limited to spectrums that are invisible to humans (e.g., infrared, ultraviolet), as well as other spectrums. In various embodiments, one or more light sources (riot depicted in FIG. 14) may be configured to rake or otherwise illuminate window 1470 with beams at various time intervals, e.g., to warn birds of the danger of the glass. In some embodiments, the light sources may be configured to utilize repeated flashing, especially where light that is invisible to humans is employed.

Figure 15:
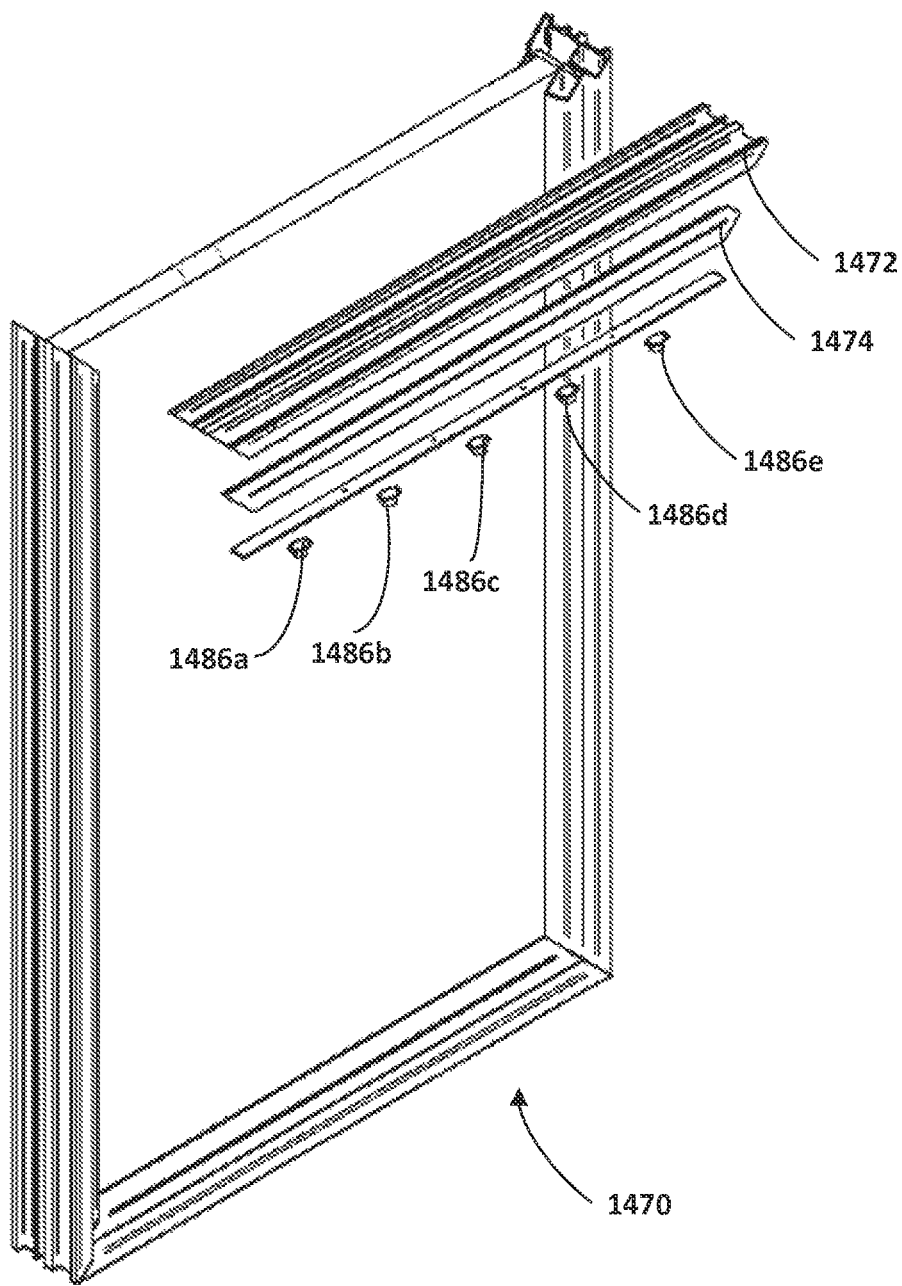
FIGS. 15 and 16A-B are views of example components that may be used to implement the technique demonstrated in FIG. 14.
Figure 16B:
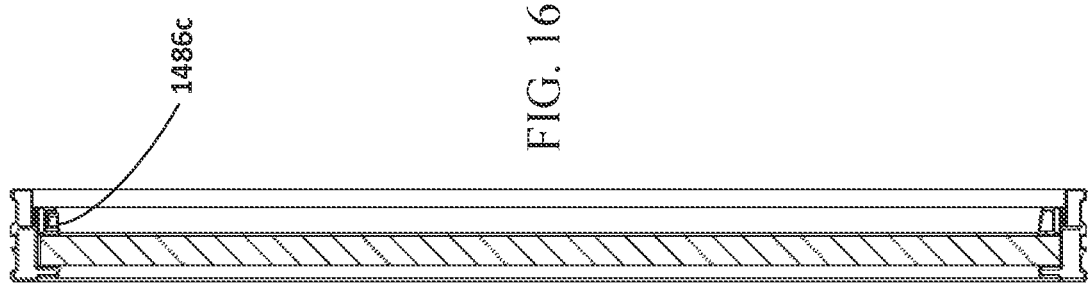
Figure 16A:
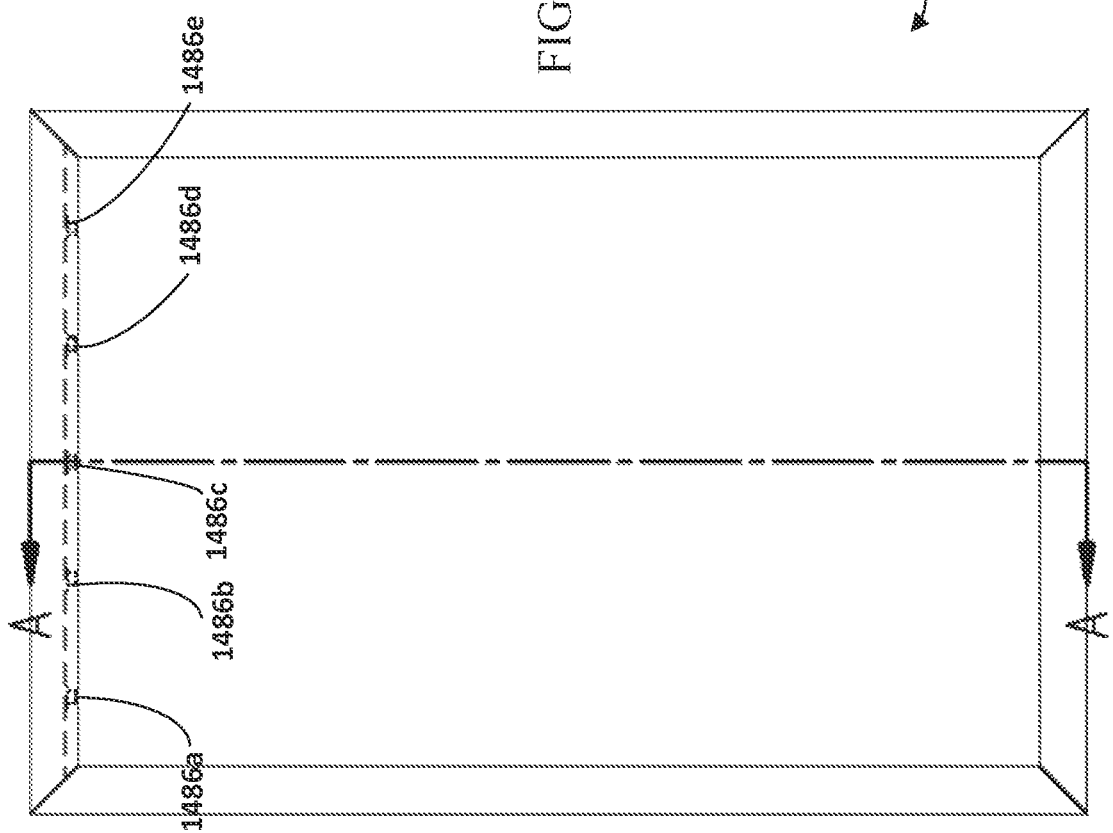

Figs. 15 and 16A-B are views of example components that may be used to implement the technique demonstrated in FIG. 14. A plurality of light sources 1486*a-e* (e.g., LEDs) may be configured to emit beams 1484*a-e*, respectively. Window 1470 may also include a head 1472 and an internal stop 1474, although these components are not required. Also, while five light sources are depicted, this is not meant to be limiting. More or less light sources may be employed without departing from the present disclosure. FIG. 16B is a cross sectional view of 16A, from the perspective of arrows A.

While the individual embodiments depicted in the Figures are depicted incorporated into curtain wall systems and windows, selected aspects of the present disclosure may alternatively be incorporated into store front systems. While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein, More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed, Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising/" "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A window lighting system, comprising:
    a frame (1071, 1171, 1271, 1471) defining a perimeter of a window (1070, 1170, 1270, 1470), the frame having a hollow interior;
    a driver (30) configured to drive one or more light sources (1076, 1176, 1276, 1486);
    a lens (46) disposed along the hollow interior to focus light emitted by the one or more light sources across a surface of the window or into an interior of a building; and
    a motion detector configured to provide, to the driver, a signal indicative of a person's presence on an exterior side of the window.

2. The window lighting system of claim 1, wherein the motion detector comprises a passive infrared (PIR) or microwave detector.

3. The window lighting system of claim 1, wherein the driver is configured to cause light to be emitted by the one or more light sources into the interior of the building in response to the signal.

4. The window lighting system of claim 3, wherein the driver is configured to cause the one or more light sources to cease emission of light into the interior of the building a predetermined time interval after receiving the signal from the motion detector.

5. The window lighting system of claim 1, wherein the one or more light sources are configured to emit one or more beams of light across the surface of the window.

6. The window lighting system of claim 5, wherein the one or more beams of light are invisible to humans.

7. The window lighting system of claim 5, wherein the one or more beams of light are ultraviolet light.

8. The window lighting system of claim 5, wherein the driver is configured to selectively energize and de-energize the one or more light sources in a pattern.

9. The window lighting system of claim 1, wherein at least the frame of the window is constructed with vinyl.

10. The window lighting system of claim 1, wherein at least the frame of the window is constructed with wood.

11. The window lighting system of claim 1, wherein at least the frame of the window is constructed with fiberglass.

12. A method of warning flying creatures of the presence of a window, comprising:
    providing, within a frame of a window, a plurality of light sources; and
    selectively energizing the plurality of light sources to emit light in a spectrum invisible to humans across a surface of the window.

13. The method of claim 12, further comprising selectively energizing the plurality of light sources in a predetermined pattern.

14. The method of claim 12, wherein the spectrum is the ultraviolet spectrum.

15. The method of claim 12, wherein the spectrum is the infrared spectrum.

\* \* \* \* \*